United States Patent
Silny

(10) Patent No.: US 9,726,542 B2
(45) Date of Patent: Aug. 8, 2017

(54) MULTI-MODE IMAGING SPECTROMETER

(71) Applicant: RAYTHEON COMPANY, Waltham, MA (US)

(72) Inventor: John F. Silny, Playa Vista, CA (US)

(73) Assignee: RAYTHEON COMPANY, Waltham, MA (US)

( * ) Notice: Subject to any disclaimer, the term of this patent is extended or adjusted under 35 U.S.C. 154(b) by 333 days.

(21) Appl. No.: 14/546,271

(22) Filed: Nov. 18, 2014

(65) Prior Publication Data

US 2016/0138974 A1 May 19, 2016

(51) Int. Cl.
| | |
|---|---|
| *G01J 3/28* | (2006.01) |
| *G01J 3/18* | (2006.01) |
| *G01J 3/04* | (2006.01) |
| *G01J 3/08* | (2006.01) |
| *G01J 3/02* | (2006.01) |

(52) U.S. Cl.
CPC ............. *G01J 3/2823* (2013.01); *G01J 3/027* (2013.01); *G01J 3/0208* (2013.01); *G01J 3/0232* (2013.01); *G01J 3/04* (2013.01); *G01J 3/08* (2013.01); *G01J 3/18* (2013.01)

(58) Field of Classification Search
CPC .... G01J 3/2823; G01J 3/04; G01J 3/08; G01J 3/0208; G01J 3/027; G01J 3/0232; G01J 3/18
See application file for complete search history.

(56) References Cited

U.S. PATENT DOCUMENTS

| | | | |
|---|---|---|---|
| 5,088,823 A * | 2/1992 | Smith, Jr. ................. | G01J 3/02 356/305 |
| 6,100,974 A | 8/2000 | Reininger | |
| 2008/0074664 A1* | 3/2008 | Ganiere ................... | G01J 3/04 356/308 |
| 2011/0079719 A1* | 4/2011 | Xu ........................ | G01J 3/4535 250/339.08 |
| 2014/0078492 A1 | 3/2014 | Silny et al. | |

FOREIGN PATENT DOCUMENTS

EP 0153139 A2 8/1985

* cited by examiner

*Primary Examiner* — Kara E Geisel
*Assistant Examiner* — Dominic J Bologna
(74) *Attorney, Agent, or Firm* — Lando & Anastasi, LLP

(57) ABSTRACT

A multi-mode imaging spectrometer that incorporates two orthogonally positioned entrance slits and is configurable between a first mode in which the system produces images of relatively wide spatial coverage with moderate spectral resolution, using a first one of the two slits, and a second mode in which the system produces images of a smaller spatial area with fine spectral resolution, using the other one of the two slits.

16 Claims, 16 Drawing Sheets

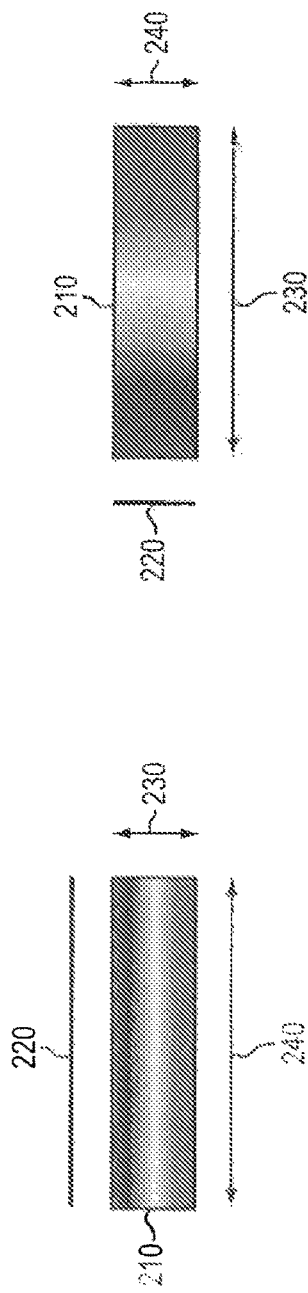

FIG. 3A  FIG. 3B  FIG. 3C  FIG. 3D  FIG. 3E  FIG. 3F

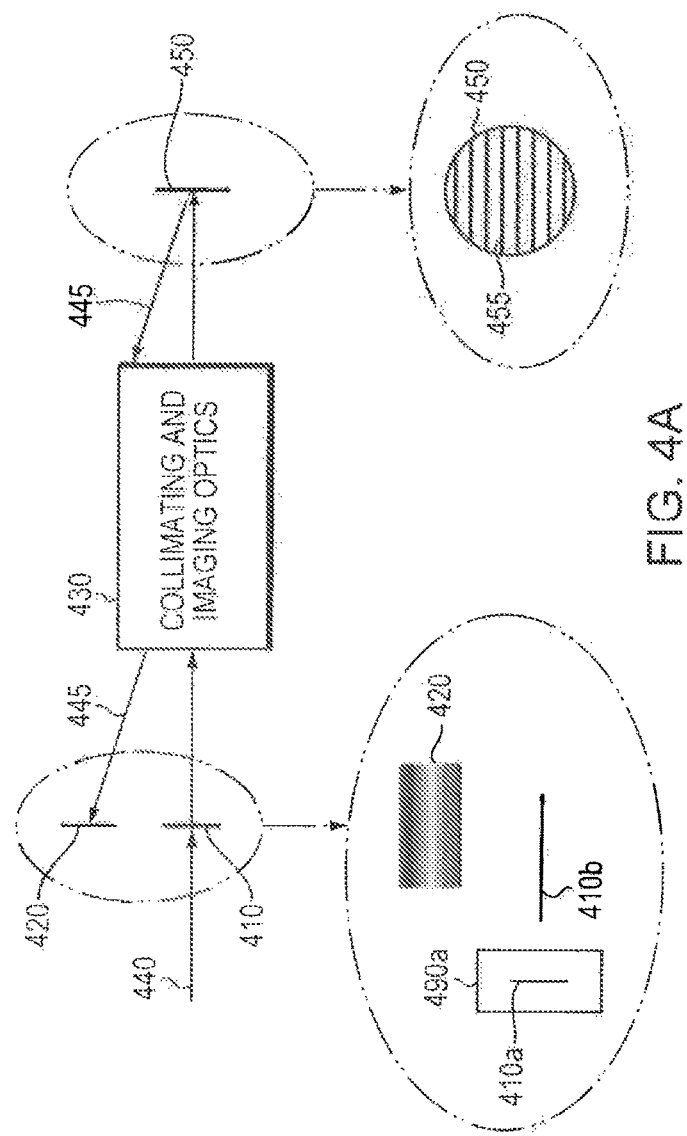

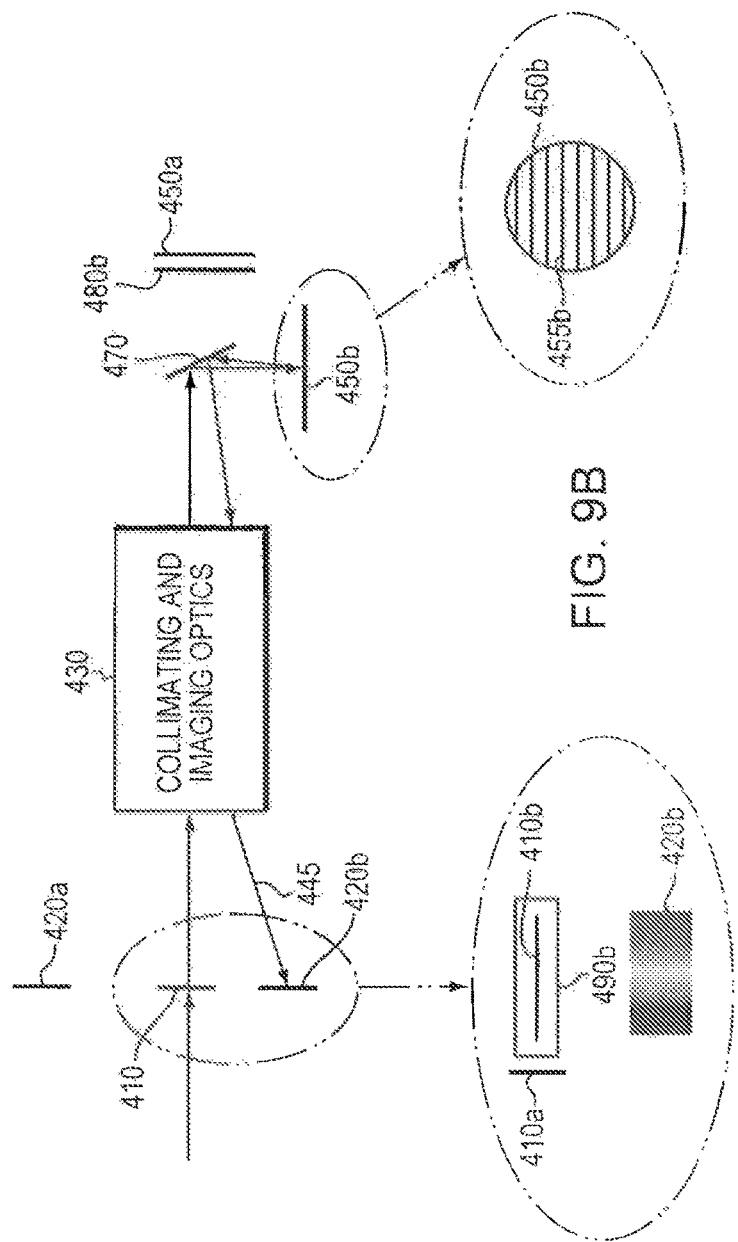

MULTI-MODE IMAGING SPECTROMETER

BACKGROUND

Imaging spectroscopy is widely used in remote sensing applications. In many applications, it may be desirable to achieve confident remote detection and identification of materials of interest, along with wide area coverage. However, for each of these two different requirements (wide area coverage versus wide spectral coverage or fine spectral resolution), the optics tend to be optimized differently, leading to different spectrometer designs. Accordingly, conventionally, multiple single-mode spectrometers, each configured for either wide area coverage (at moderate spectral resolution) or moderate area coverage (at fine spectral resolution), are used together to achieve these goals. However, many remote sensing platforms are subject to stringent size, weight, power, and cost (SWAP-C) constraints, making it undesirable to have to accommodate multiple spectrometers.

SUMMARY OF INVENTION

Accordingly, aspects and embodiments are directed to a multi-mode imaging spectrometer that is configurable between different modes and thereby able to provide both wide area coverage and fine spectral resolution with a single set of spectrometer optics for reduced SWAP-C. As discussed in more detail below, according to certain embodiments, a single imaging spectrometer is configured with two modes of operation. A first mode may provide wide area, moderate spectral resolution data collection, and may be used, for example, to scan an area to detect materials or objects of interest. A second mode may provide narrow area, fine spectral resolution collection, and may be used, for example, to analyze and identify a material or object of interest that was detected while the spectrometer was being operated in the first mode.

According to one embodiment, a multi-mode imaging spectrometer includes a first entrance slit having a first orientation, a second entrance slit having a second orientation, the second orientation being nominally orthogonal to the first orientation, at least one dispersive element configured to spectrally disperse electromagnetic radiation and provide spectrally dispersed electromagnetic radiation, collimating and imaging optics configured to receive the electromagnetic radiation from the first entrance slit during a first mode of operation of the imaging spectrometer and from the second entrance slit during a second mode of operation of the imaging spectrometer, and to direct the electromagnetic radiation to the at least one dispersive element, at least one imaging detector configured to receive the spectrally dispersed electromagnetic radiation and produce image data therefrom, the collimating and imaging optics being further configured to direct and focus the spectrally dispersed electromagnetic radiation onto the at least one imaging detector, and a processor coupled to the at least one imaging detector and configured to receive and process image data from the at least one imaging detector and to select one of the first and second modes of operation of the multi-mode imaging spectrometer responsive to processing the image data.

In one example, the at least one imaging detector has a two-dimensional image plane with non-square aspect ratio and being positioned such that a first dimension of the image plane is aligned with a length of the first entrance slit and a second dimension of the image plane is aligned with a length of the second entrance slit.

In one example, the at least one dispersive element is a grating. The grating may be movable. Accordingly, in the first mode of operation the grating may be positioned such that spectrally dispersed electromagnetic radiation is imaged along one dimension of the detector, and in the second mode of operation, the grating may be rotated 90 degrees relative to the first position and tilted with respect to the normal to the optical axis such that spectrally dispersed electromagnetic radiation is imaged along the second dimension of the imaging detector. In one example, the at least one imaging detector includes a first imaging detector and a second imaging detector. In the first mode of operation of the multi-mode imaging spectrometer, the spectrometer is configured such that the collimating and imaging optics focus the spectrally dispersed electromagnetic radiation from the grating onto the first imaging detector. In the second mode of operation of the multi-mode imaging spectrometer, the spectrometer is configured such that collimating and imaging optics may focus the spectrally dispersed electromagnetic radiation from the grating onto the second imaging detector.

In another example, the at least one dispersive element is a prism.

The multi-mode imaging spectrometer may further include a movable fold mirror, and the at least one dispersive element may include a first dispersive element and a second dispersive element. In the first mode of operation, the collimating and imaging optics may be configured to direct the electromagnetic radiation from the first entrance slit to the first dispersive element, and to focus the spectrally dispersed electromagnetic radiation from the first dispersive element onto the at least one imaging detector. In the second mode of operation, the movable fold mirror may be positioned in an optical path between the collimating and imaging optics and the second dispersive element, wherein the collimating and imaging optics direct the electromagnetic radiation from the second entrance slit to movable fold mirror, and to focus the spectrally dispersed electromagnetic radiation from the fold mirror onto the at least one imaging detector, and wherein the fold mirror is configured to reflect the electromagnetic radiation from the collimating and imaging optics to the second dispersive element, and to reflect the spectrally dispersed electromagnetic radiation from the second dispersive element to the collimating and imaging optics. In one example, the at least one imaging detector includes a first imaging detector and a second imaging detector. In the first mode of operation, the spectrometer may be configured such that the collimating and imaging optics focus the spectrally dispersed electromagnetic radiation onto the first imaging detector, and in the second mode of operation, the spectrometer may be configured such that the collimating and imaging optics focus the spectrally dispersed electromagnetic radiation onto the second imaging detector.

In one example, the multi-mode imaging spectrometer further includes a beamsplitter, either dichroic or amplitude, and the at least one dispersive element includes a first dispersive element and a second dispersive element. The collimating and imaging optics may be configured to direct the electromagnetic radiation to the beamsplitter, and the beamsplitter may be configured to split the electromagnetic radiation into a first portion and a second portion, and to direct the first portion to the first dispersive element and the second portion to the second dispersive element. In another example, the multi-mode imaging spectrometer further includes at least one movable shutter. In the first mode of operation, the at least one movable shutter may be positioned in front of the second dispersive element to block the second dispersive element, and the collimating and imaging optics may be configured to focus the spectrally dispersed electromagnetic radiation from the first dispersive element onto the at least one imaging detector. In the second mode of operation, the at least one movable shutter may be positioned in front of the first dispersive element to block the first dispersive element, and the collimating and imaging optics may be configured to focus the spectrally dispersed electromagnetic radiation from second dispersive element onto the at least one imaging detector. In another example, the at least one imaging detector includes a first imaging detector and a second imaging detector. In the first mode of operation, the spectrometer is configured such that the collimating and imaging optics focus the spectrally dispersed electromagnetic radiation from the first dispersive element onto the first imaging detector. In the second mode of operation, the spectrometer is configured such that the collimating and imaging optics focus the spectrally dispersed electromagnetic radiation from second dispersive element onto the second imaging detector.

In another example, the multi-mode imaging spectrometer further includes a two-axis scanning assembly configured to scan the field-of-view of the imaging spectrometer over the desired area of the scene.

The collimating and imaging optics may be arranged in either a double-pass configuration (common collimating and imaging optics) or a single-pass configuration (separate collimating and imaging optics).

According to another embodiment, the method of operating a multi-mode imaging spectrometer includes selecting a first mode of operation of the multi-mode imaging spectrometer, and in the first mode receiving first electromagnetic radiation from a scene via a first entrance slit, spectrally dispersing the first electromagnetic radiation, thereby producing first spectrally dispersed electromagnetic radiation, and imaging the first spectrally dispersed electromagnetic radiation with at least one imaging detector to produce a first spectral image of the scene having a first spectral resolution. The method further includes subsequently selecting a second mode of operation of the multi-mode imaging spectrometer, and in the second mode receiving second electromagnetic radiation from a portion of the scene via a second entrance slit that is nominally orthogonally oriented relative to the first entrance slit, spectrally dispersing the second electromagnetic radiation, thereby producing second spectrally dispersed electromagnetic radiation, and imaging the second spectrally dispersed electromagnetic radiation with the at least one imaging detector to produce a second spectral image of the portion of the scene having a second spectral resolution, the second spectral resolution being finer than the first spectral resolution.

In one example, spectrally dispersing the first electromagnetic radiation includes spectrally dispersing the first electromagnetic radiation using a grating, and spectrally dispersing the second electromagnetic radiation includes rotating the grating approximately 90 degrees, and tilting the grating relative to the normal to an optical axis along which the second electromagnetic radiation is received at the grating.

In another example, imaging the first spectrally dispersed electromagnetic radiation includes imaging the first spectrally dispersed electromagnetic radiation using a first imaging detector, and imaging the second spectrally dispersed electromagnetic radiation includes imaging the second spectrally dispersed electromagnetic radiation using a second imaging detector.

In one example, spectrally dispersing the first electromagnetic radiation includes spectrally dispersing the first electromagnetic radiation using a first dispersive element, and spectrally dispersing the second electromagnetic radiation includes positioning a fold mirror into an optical path between the second entrance slit and a second dispersive element, reflecting the second electromagnetic onto the second dispersive element with the fold mirror, spectrally dispersing the second electromagnetic radiation with the second dispersive element, thereby producing the second spectrally dispersed electromagnetic radiation, and reflecting the second spectrally dispersed electromagnetic radiation towards the at least one imaging detector with the fold mirror. In one example, imaging the first spectrally dispersed electromagnetic radiation includes imaging the first spectrally dispersed electromagnetic radiation using a first imaging detector, and imaging the second spectrally dispersed electromagnetic radiation includes imaging the second spectrally dispersed electromagnetic radiation using a second imaging detector.

In another example, selecting the first mode of operation includes shuttering the second entrance slit, and subsequently selecting the second mode of operation includes opening the second entrance slit and shuttering the first entrance slit.

The method may further include analyzing the first spectral image with a processor, and subsequently selecting the second mode of operation based on information obtaining from analyzing data from the first mode. In one example, analyzing the first spectral image includes detecting an object of interest in the scene, and selecting the second mode of operation which includes directing a field of view of the spectrometer toward the portion of the scene containing the detected object of interest. The second mode of operation may be used to identify the object of interest.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2A is an illustration of a first slit-FPA arrangement;

FIG. 2B is an illustration of a second slit-FPA arrangement;

FIGS. 3A-F are illustrations of various examples of orthogonal slit configurations according to aspects of the invention;

FIG. 4A is a block diagram of one example of a multi-mode imaging spectrometer, shown configured for a first mode of operation, according to aspects of the present invention;

FIG. 9B is a block diagram of the multi-mode imaging spectrometer of FIG. 9A, shown configured for a second mode of operation, according to aspects of the present invention.

DETAILED DESCRIPTION

Aspects and embodiments are directed to a passive electro-optical imaging spectrometer remote sensor. In particular, aspects and embodiments are directed to a configurable multi-mode imaging spectrometer in which a single optical prescription is used to provide either wide area/spatial coverage (for example, hundreds or thousands of samples) with moderate spectral resolution (e.g., tens or hundreds of channels), or moderate area coverage (e.g., tens or hundreds of samples) with fine spectral resolution (e.g., hundreds or thousands of channels). The spectrometer may be dynamically reconfigured to achieve sequential modes of operation. As discussed in more detail below, embodiments of the multi-mode spectrometer incorporate the use of two orthogonal entrance slits, one for each of two different modes of operation, with optional shuttering of the unused slit in either mode to reduce or prevent unwanted stray light and optical crosstalk. A two-axis scanning assembly is used to enable efficient scanning and imaging using either slit. Various embodiments may incorporate either a single imaging detector (e.g., a focal plane array) that is used for both modes of operation, or multiple imaging detectors, to balance system complexity versus flexibility, as discussed further below. In certain embodiments, an imaging system may include a real-time processor or other computing device coupled to the spectrometer that provides control signals to reconfigure the spectrometer between the different modes of operation, optionally based on information obtained during the imaging process, as also discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
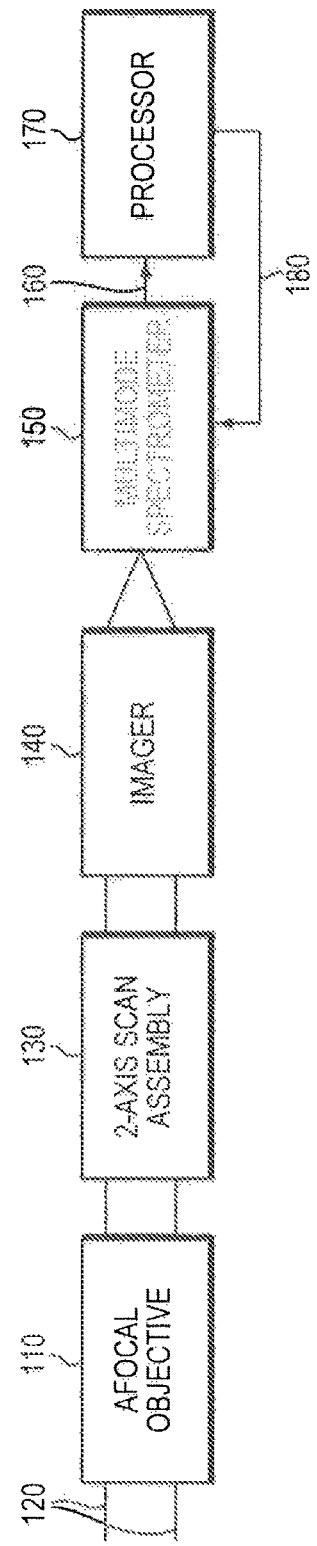
FIG. 1 is a block diagram of one example of a system including a multi-mode imaging spectrometer according to aspects of the present invention.

Referring to FIG. 1, there is illustrated a block diagram of one example of a configurable multi-mode imaging spectrometer system according to certain embodiments. As illustrated, the system includes an afocal objective 110 that receives incident "white light" electromagnetic radiation 120 from a scene and directs a collimated beam of the electromagnetic radiation (parallel rays) to a two-axis scanning assembly 130. In some configurations, afocal objective 110 is not required and the first optical element in the path is the two-axis scanning assembly. In some configurations, the two-axis scanning assembly 130 includes a two-axis scan mirror. However, in other embodiments, the two-axis scanning assembly may include any device or mechanism that controls the line-of-sight of the optical system (e.g., a beam steering mirror, head mirror, coelostat, optical phased array, gimbal assembly, etc.). Imaging optics 140 relay and focus the electromagnetic radiation 120 onto a multi-mode spectrometer sub-system 150. The afocal objective 110 and imaging optics 140 may each include one or more lenses and/or mirrors designed to accommodate (direct, collimate, and focus) the electromagnetic radiation at least over a spectral range of interest for imaging by the multi-mode spectrometer 150. As discussed further below, the multi-mode spectrometer 150 includes a dispersive element, such as a diffraction grating or a refractive prism, for example, to spectrally disperse the electromagnetic radiation 120, and at least one imaging detector, such as a focal plane array (FPA), for example. Image data 160 from the one or more FPAs of the multi-mode spectrometer 150 is provided to a processor 170, optionally in real time as discussed further below. The processor 170 may include any type of computing or image processing device capable of receiving and operating on the image data 160 supplied from the multi-mode spectrometer 150. As discussed in more detail below, the processor may further control the multi-mode spectrometer 150 (as represented by feedback arrow 180) to select an operating mode of the spectrometer based on the processing of the image data 160.

As discussed above, embodiments of the multi-mode spectrometer incorporate the use of two orthogonal slits to enable the multi-mode capability. Referring to FIGS. 2A and 2B, for an FPA 210 having a non-square aspect ratio (e.g., 4:1, 8:1, etc.), the orientation of the spectral dispersion over the FPA (spectral dimension) defines whether the system provides wide spatial coverage or fine spectral resolution. As shown in FIG. 2A, in the case where the slit 220 is aligned with a "long" dimension of the FPA 210 (and the dispersive element correspondingly aligned), the spectral dimension 230 is "vertical" and the spatial dimension 240 is "horizontal," aligned with the "long" dimension of the FPA 210. In this case, the system provides a large number of spatial samples (e.g., hundreds or thousands) and therefore wide area coverage, along with a lower number of spectral channels (e.g., tens or hundreds) and therefore moderate spectral resolution. Referring to FIG. 2B, for an orthogonal slit orientation, with the slit 220 aligned instead with the "short" dimension of the FPA 210 (and the dispersive element correspondingly aligned), the spectral dimension 230 is aligned with the "long" dimension of the FPA 210 and the system provides fine spectral resolution (e.g., hundreds or thousands of spectral channels) with relatively narrow area coverage (e.g., tens or hundreds of spatial samples). By including two orthogonally orientated slits and configuring the spectrometer to sequentially operate with one slit orientation and then the other, two sequential modes of operation may be achieved, one providing wide area coverage with moderate spectral resolution and the other providing fine spectral resolution over a smaller imaged area. The two orthogonal slits may be positioned such that the same afocal objective, imaging optics, and spectrometer optics (same optical prescription) may be used for both modes of operation.

There are numerous configurations of two orthogonal slits (a first slit 310 and a second slit 320) that may be used, some examples of which are illustrated in FIGS. 3A-F.

There are further several different configurations of a multi-mode spectrometer which may incorporate any of the orthogonal slit arrangements shown in FIGS. 3A-F, or other orthogonal slit configurations. As discussed above, various embodiments may further include one or more FPAs arranged to receive electromagnetic radiation via the slit(s). Some examples of embodiments of a multi-mode imaging spectrometer are discussed below with reference to FIGS. 4A-9B. Those skilled in the art will appreciate, given the benefit of this disclosure, that a variety of other embodiments may be implemented and are within the scope of this disclosure.

Figure 4B:
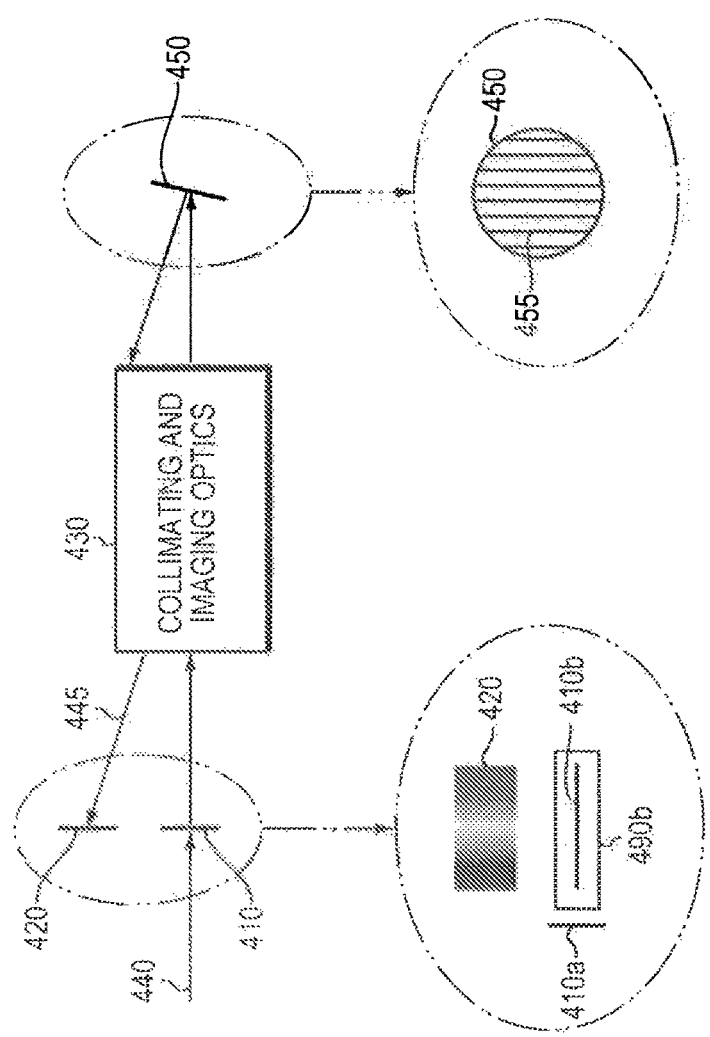
FIG. 4B is a block diagram of the multi-mode imaging spectrometer of FIG. 4A, shown configured for a second mode of operation, according to aspects of the present invention.

Referring to FIGS. 4A and 4B, there is illustrated a block diagram of one example of a multi-mode imaging spectrometer according to certain embodiments. The multi-mode imaging spectrometer includes a pair of orthogonally positioned slits 410 and a single imaging detector (e.g., an FPA) 420. Collimating and imaging optics 430 direct incident electromagnetic radiation 440 from one of the pair of slits 410 (depending on the mode of operation of the spectrometer, as discussed further below) to a dispersive element 450. The collimating and imaging optics 430 of the spectrometer are depicted as a single entity (i.e., as would be implemented in a "double-pass" imaging spectrometer); however, in practice may be implemented as two distinct entities (i.e., as would be implemented in a "single-pass" imaging spectrometer). In one example, the dispersive element 450 is a grating. Although the following discussion will refer to the dispersive element 450 as a grating, those skilled in the art will appreciate, given the benefit of this disclosure, that in other embodiments other dispersive elements (such as a prism, for example) may be used. The grating 450 spectrally disperses the incident electromagnetic radiation 440 to provide spectrally dispersed electromagnetic radiation 445 that is directed and focused onto the FPA 420 by the collimating and imaging optics 430, as illustrated.

The pair of orthogonally positioned slits 410 includes a first slit 410a that is aligned along the short dimension of the FPA 420 and a second slit 410b that is aligned along the long dimension of the FPA 420. Referring to FIG. 4A, in a first mode of operation of the spectrometer, the first slit 410a may be shuttered (e.g., using a shutter 490a), and the electromagnetic radiation is directed from the second slit 410b to the grating 450, where it is spectrally dispersed and then focused onto the FPA 420 by the collimating and imaging optics 430, as discussed above. The grating 450 may include a pattern of grooves 455, as shown, which cause the spectral dispersion of the electromagnetic radiation 440. In the arrangement shown in FIG. 4A, the grooves 455 of the grating 450 are aligned such that light is dispersed across the short dimension of FPA 420. In the first mode of operation, spectral dispersion (the spectral dimension) is along the short dimension of the FPA 420, while the spatial dimension (aligned with the length of the second slit 410b) is over the long dimension of the FPA 420. Accordingly, in this mode of operation, the spectrometer may provide relatively wide area coverage with moderate spectral resolution.

Referring to FIG. 4B, the spectrometer may alternatively be configured into a second mode of operation, wherein the second slit 410b may be shuttered (e.g., using a shutter 490b), and the electromagnetic radiation is directed from the first slit 410a to the grating 450, where it is spectrally dispersed and then focused onto a single FPA 420 by the collimating and imaging optics 430, as discussed above. Additionally, in this mode of operation, the grating 450 may be rotated 90° and tilted relative to the normal to the optical axis of the collimating and imaging optics 430, as shown in the FIG. 4B. The grooves 455 of grating 450 are aligned such that light is dispersed across the long dimension of FPA 420. In the mode of FIG. 4A the "tilt" is provided by the dispersion grating 450; however, when the grating is rotated for the second mode of operation, the dispersion is in the other dimension and therefore the grating itself may be tilted to correctly direct the dispersed light to FPA 420, as shown in FIG. 4B. In the second mode of operation, the spectral dimension is along the long dimension of the FPA 420, while the spatial dimension (aligned with the length of the first slit 410a) is along the short dimension of the FPA 420. Accordingly, in this mode of operation, the spectrometer may provide fine spectral resolution over a relatively smaller imaged area.

Figure 5A:
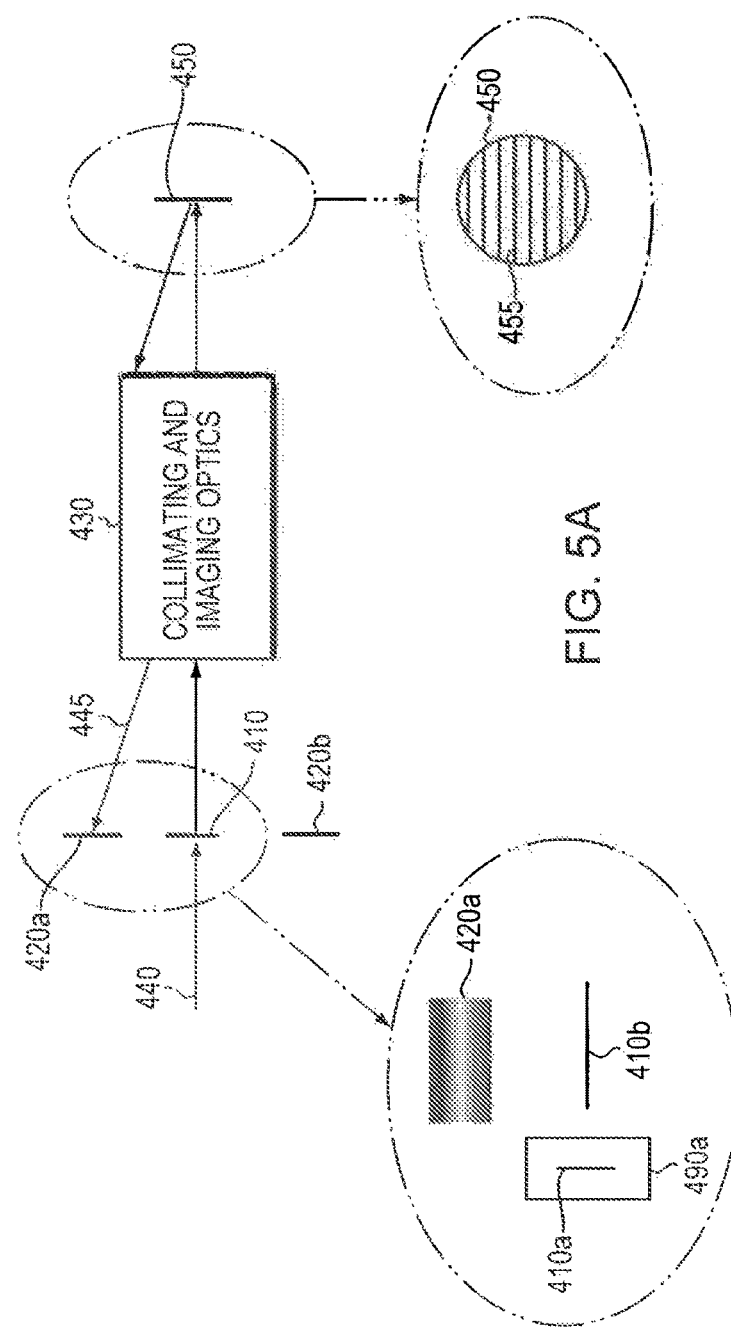
FIG. 5A is a block diagram of another example of a multi-mode imaging spectrometer, shown configured for a first mode of operation, according to aspects of the present invention.
Figure 5B:
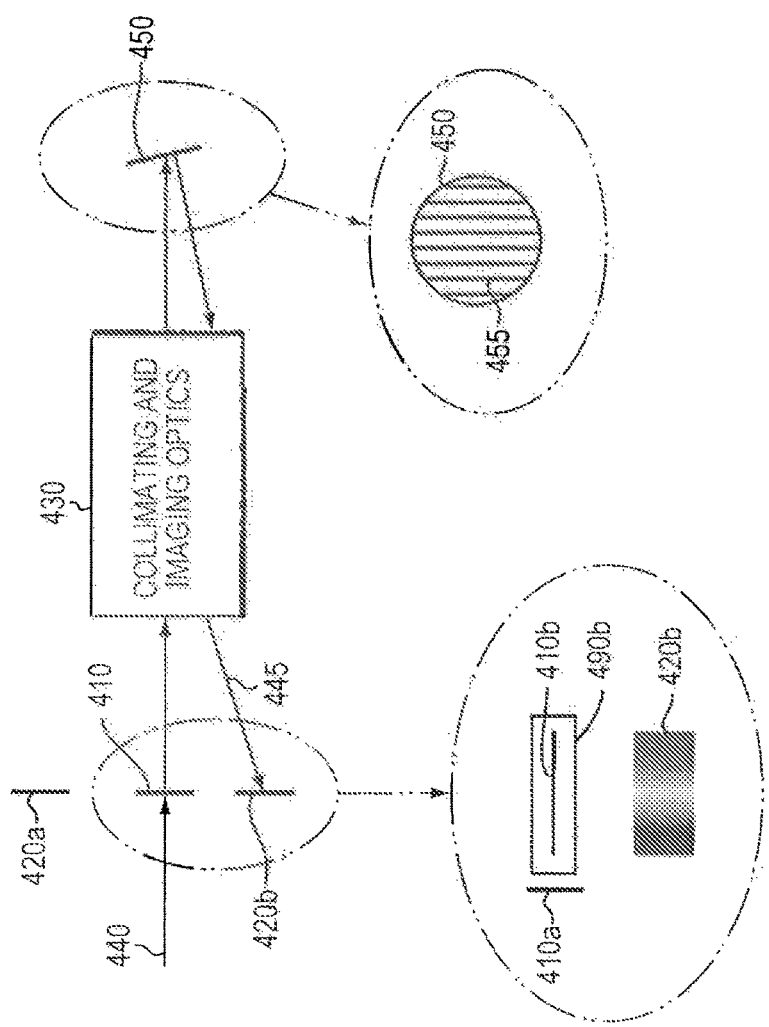
FIG. 5B is a block diagram of the multi-mode imaging spectrometer of FIG. 5A, shown configured for a second mode of operation, according to aspects of the present invention.

FIGS. 5A and 5B illustrate another embodiment of a multi-mode imaging spectrometer including two imaging detectors (e.g., two FPAs). FIGS. 5A and 5B are similar to FIGS. 4A and 4B, but utilize multiple distinct detectors (e.g., two FPAs) rather than a single detector. FIG. 5A illustrates the spectrometer configured for a first mode of operation, while FIG. 5B illustrates the spectrometer configured for a second mode of operation. Referring to FIG. 5A, in the first mode of operation of the spectrometer, the first slit 410a may be shuttered, and the electromagnetic radiation is directed from the second slit 410b to the grating 450, where it is spectrally dispersed and then focused onto a first FPA 420a by the collimating and imaging optics 430, as discussed above. Similar to the configuration discussed above with reference to FIG. 4A, in this arrangement the grating 450 may be positioned such that the grooves 455 are aligned such that light is dispersed across the short dimension of FPA 420a. The spectral dimension is along the short dimension of the first FPA 420a, while the spatial dimension (aligned with the length of the second slit 410b) is over the long dimension of the first FPA 420a. Accordingly, in the first mode of operation, the spectrometer may provide relatively wide area coverage with moderate spectral resolution.

Referring to FIG. 5B, in the second mode of operation, the second slit 410b may be shuttered, and the electromagnetic radiation 440 is directed from the first slit 410a to the grating 450 where it is spectrally dispersed. The grating 450 is rotated 90° relative to its positioning in the arrangement of FIG. 5A, the grooves 455 aligned such that light is dispersed across the long dimension of FPA 420b, and the grating 450 tilted with respect to the normal to the optical axis along which the electromagnetic radiation 440 is directed toward to the grating, as discussed above. The collimating and imaging optics 430 are configured to focus the spectrally dispersed electromagnet radiation 445 onto a second FPA 420b. In the second mode of operation, the spectral dimension is along the long dimension of the second FPA 420b, while the spatial dimension (aligned with the length of the first slit 410a) is along the short dimension of the second FPA 420b. Accordingly, in this mode of operation, the spectrometer may provide fine spectral resolution over a relatively smaller imaged area.

Figure 6A:
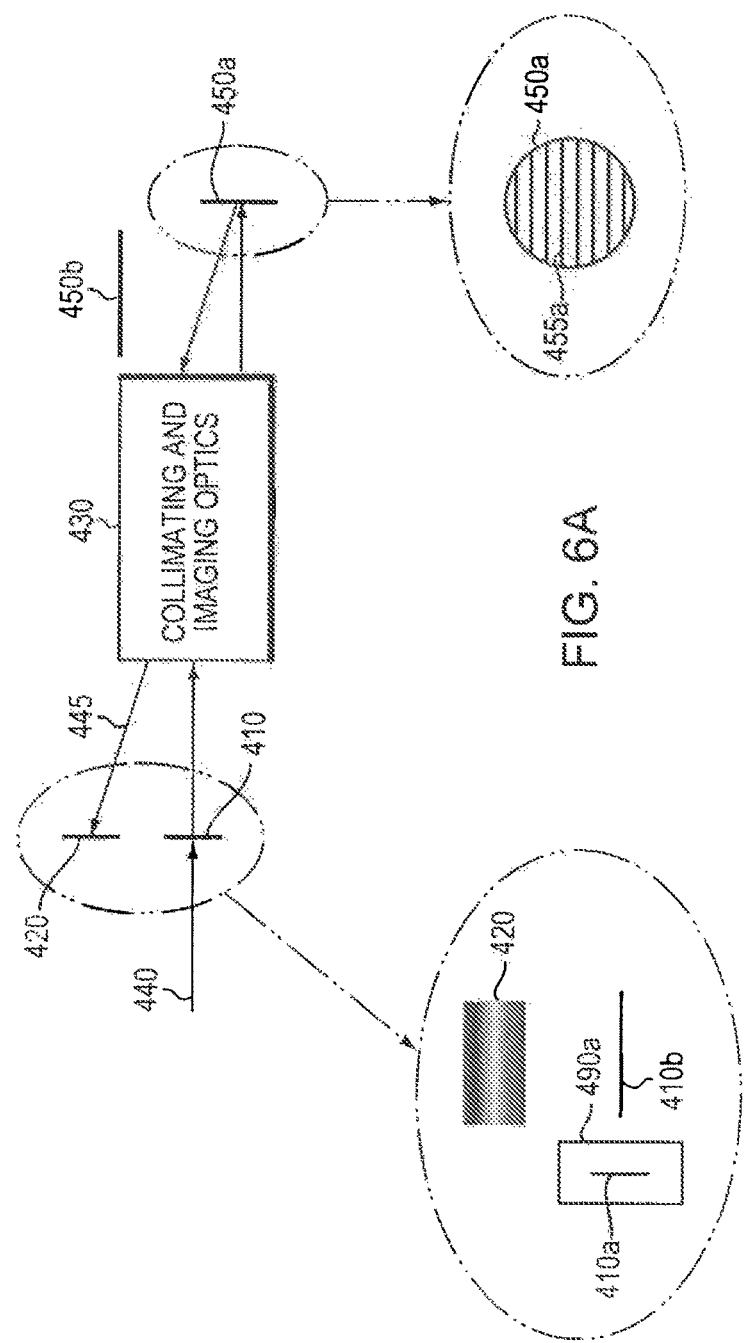
FIG. 6A is a block diagram of another example of a multi-mode imaging spectrometer, shown configured for a first mode of operation, according to aspects of the present invention.
Figure 6B:
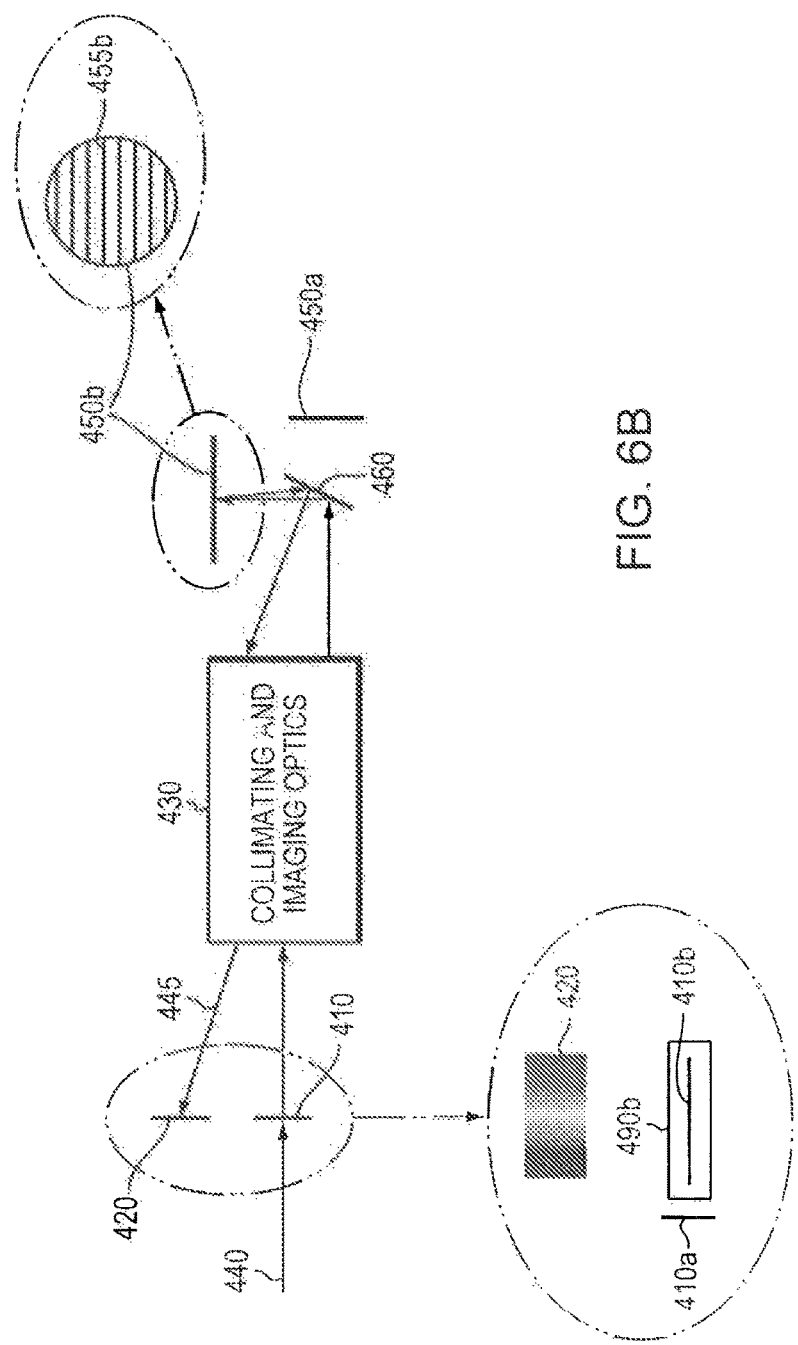
FIG. 6B is a block diagram of the multi-mode imaging spectrometer of FIG. 6A, shown configured for a second mode of operation, according to aspects of the present invention.

FIGS. 6A and 6B illustrate another embodiment of a multi-mode imaging spectrometer including a single imaging detector 420 and two gratings 450a, 450b, wherein one of the two gratings is used in each mode of operation. FIG. 6A illustrates the spectrometer configured for the first mode of operation, while FIG. 6B illustrates the spectrometer configured for the second mode of operation. Referring to FIG. 6A, in the first mode of operation of the spectrometer, the first slit 410a may be shuttered, and the electromagnetic radiation is directed from the second slit 410b to a first grating 450a, where it is spectrally dispersed and then focused onto the FPA 420 by the collimating and imaging optics 430, as discussed above. As shown in FIG. 6A, the first grating 450a may be positioned such that the grooves 455a are aligned such that light is dispersed across the short dimension of FPA 420. The spectral dimension is along the short dimension of the FPA 420, while the spatial dimension (aligned with the length of the second slit 410b) is over the long dimension of the FPA 420. Accordingly, in the first mode of operation, the spectrometer may provide relatively wide area coverage with moderate spectral resolution, as discussed above.

Referring to FIG. 6B, in the second mode of operation, the second slit 410b may be shuttered, and the electromagnetic radiation 440 enters the system via the first slit 410a. A fold mirror 460 is moved into the optical path of the electromagnetic radiation 440, and directs the electromagnetic radiation to a second grating 450b where it is spectrally dispersed. The second grating 450b is positioned such that the grooves 455b are aligned such that light is dispersed across the long dimension of FPA 420. In this configuration, the "tilt" (as required in FIG. 4B) is achieved by inserting the fold mirror 460 at the correct angle to direct light to the FPA 420. The spectrally dispersed electromagnetic radiation 445 is directed via the fold mirror 460 and the collimating and imaging optics 430 to the FPA 420. In the second mode of operation, the spectral dimension is along the long dimension of the FPA 420, while the spatial dimension (aligned with the length of the first slit 410a) is along the short dimension of the FPA 420. Accordingly, in this mode of operation, the spectrometer may again provide fine spectral resolution over a relatively smaller imaged area.

Figure 7A:
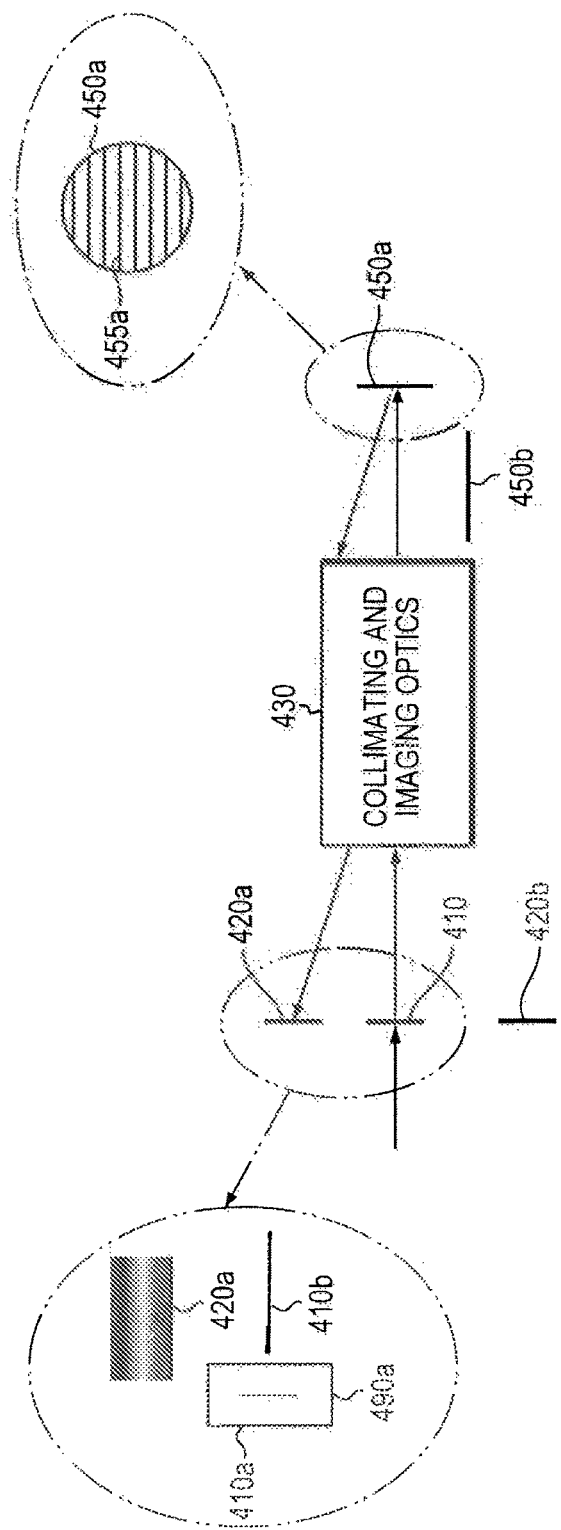
FIG. 7A is a block diagram of another example of a multi-mode imaging spectrometer, shown configured for a first mode of operation, according to aspects of the present invention.
Figure 7B:
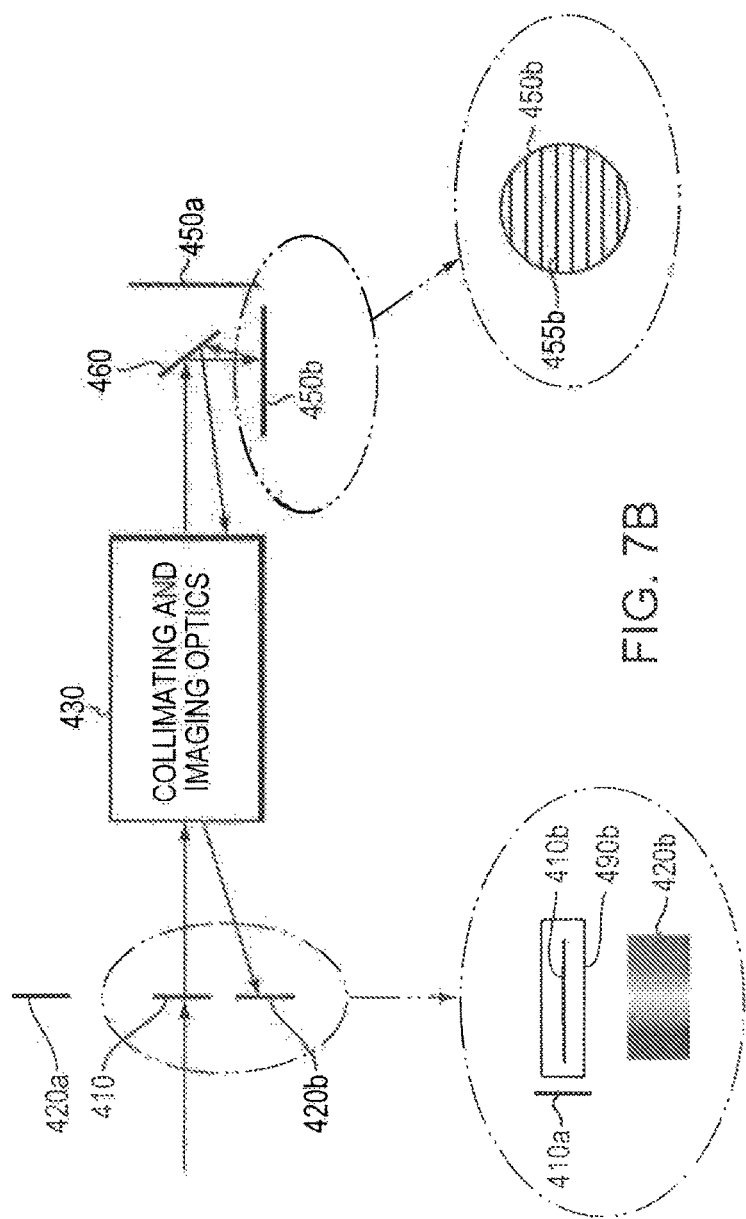
FIG. 7B is a block diagram of the multi-mode imaging spectrometer of FIG. 7A, shown configured for a second mode of operation, according to aspects of the present invention.

FIGS. 7A and 7B illustrate another embodiment of a multi-mode imaging spectrometer that incorporates the use of two gratings and two imaging detectors, one of each being used in either of the two modes of operation. FIGS. 7A and 7B are similar to FIGS. 6A and 6B, but utilize multiple distinct detectors (e.g., two FPAs) rather than a single detector. Referring to FIG. 7A, in the first mode of operation of the spectrometer, the first slit 410a may be shuttered, and the electromagnetic radiation is directed from the second slit 410b to a first grating 450a, where it is spectrally dispersed and then focused onto the first FPA 420a by the collimating and imaging optics 430. As discussed above, the first grating 450a may be positioned such that the grooves 455a are aligned such that light is dispersed across the short dimension of FPA 420b. The spectral dimension is along the short dimension of the first FPA 420a, while the spatial dimension (aligned with the length of the second slit 410b) is over the long dimension of the first FPA 420a. Accordingly, as discussed above, in the first mode of operation, the spectrometer may provide relatively wide area coverage with moderate spectral resolution.

Referring to FIG. 7B, in the second mode of operation, the second slit 410b may be shuttered, and the electromagnetic radiation 440 enters the system via the first slit 410a. For this mode of operation, the fold mirror 460 is positioned in the optical path of the electromagnetic radiation 440, and directs the electromagnetic radiation to the second grating 450b where it is spectrally dispersed. Similar to the arrangement discussed above with reference to FIG. 6B, the second grating 450b is positioned such that the grooves 455b are aligned such that light is dispersed across the long dimension of FPA 420a, and tilting is achieved by inserting fold mirror 460 at the correct angle. The spectrally dispersed electromagnetic radiation 445 is directed via the fold mirror 460 and the collimating and imaging optics 430 to the second FPA 420b. In the second mode of operation, the spectral dimension is along the long dimension of the second FPA 420b, while the spatial dimension (aligned with the length of the first slit 410a) is along the short dimension of the second FPA 420b. Accordingly, in this mode of operation, the spectrometer may provide fine spectral resolution over a relatively smaller imaged area, as discussed above.

Figure 8A:
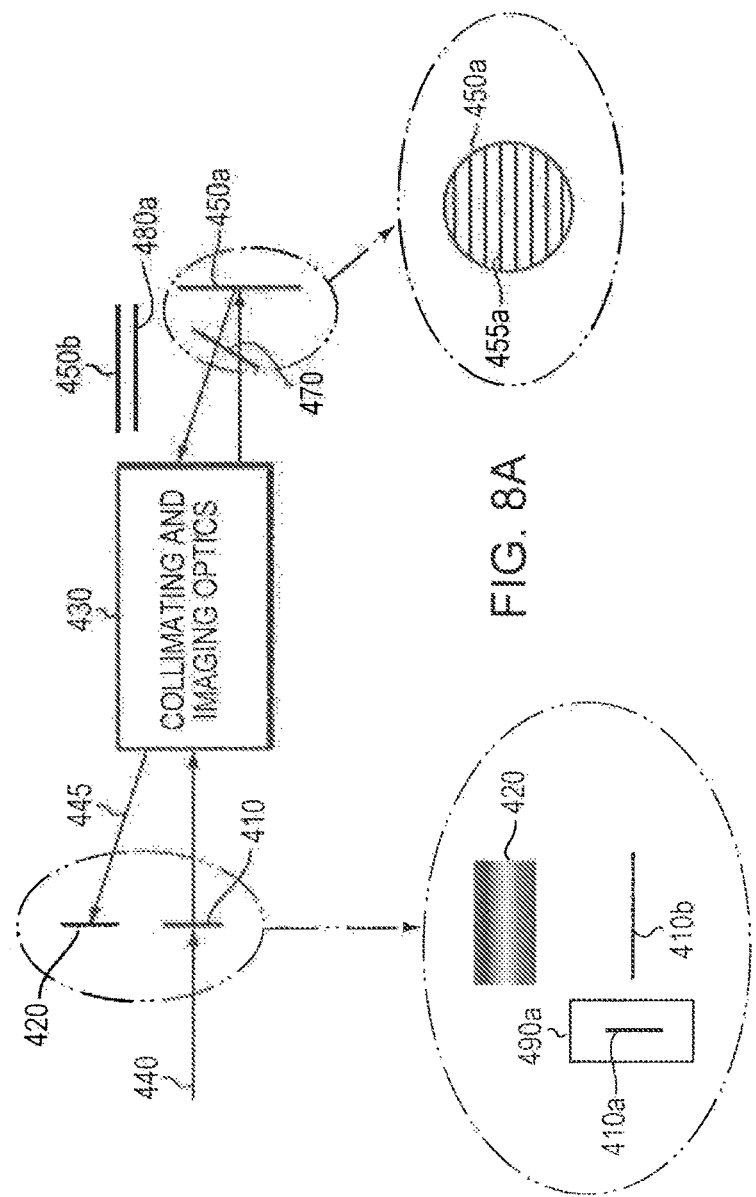
FIG. 8A is a block diagram of another example of a multi-mode imaging spectrometer, shown configured for a first mode of operation, according to aspects of the present invention.
Figure 8B:
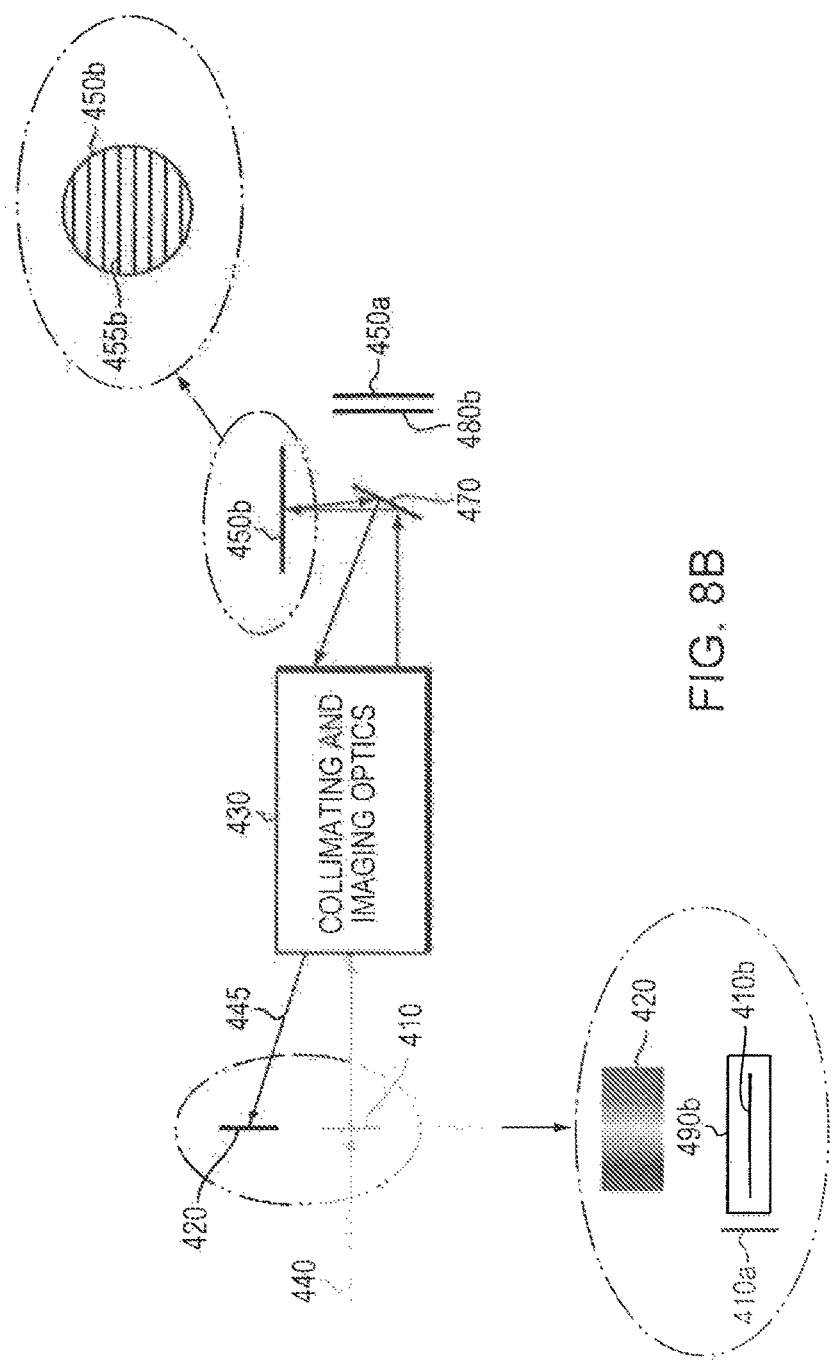
FIG. 8B is a block diagram of the multi-mode imaging spectrometer of FIG. 8A, shown configured for a second mode of operation, according to aspects of the present invention.
Figure 9A:
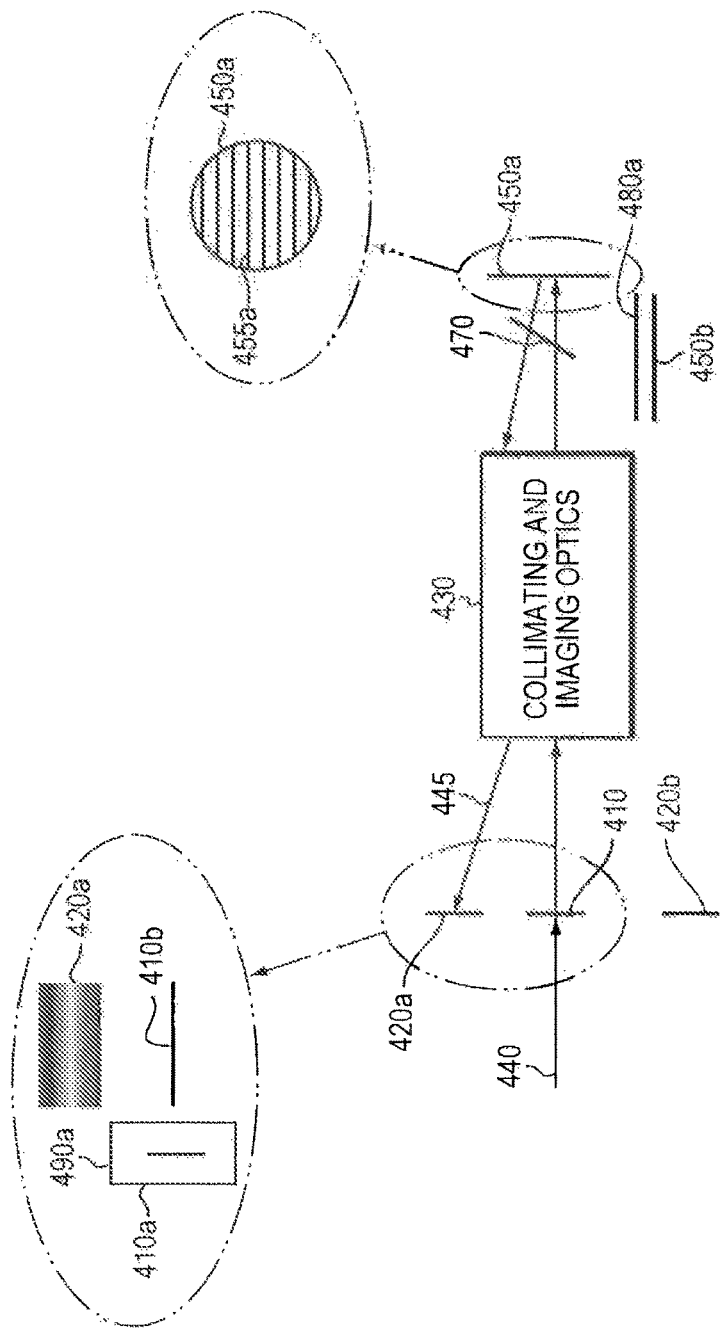
FIG. 9A is a block diagram of another example of a multi-mode imaging spectrometer, shown configured for a first mode of operation, according to aspects of the present invention.

FIGS. 8A and 8B, and 9A and 9B, illustrate embodiments of a multi-mode imaging spectrometer that incorporate the use of two gratings (one used in each mode of operation, as discussed above) and a beamsplitter, splitting either by wavelength (dichroic) or by amplitude. FIGS. 8A and 8B illustrate an example of such an embodiment using a single imaging detector for both modes of operation, whereas FIGS. 9A and 9B illustrate an example that includes a separate imaging detector for each mode. The use of the beamsplitter may obviate the need for the fold mirror 470 to accommodate the two gratings; however, with this arrangement, it may be preferable to selectively shutter the unused grating during each mode of operation, as discussed further below. As is the case in the embodiment of FIGS. 7A and 7B, in the embodiments of FIGS. 8A-9B, because a dedicated grating is used for each mode of operation, both gratings 450a and 450b may be positioned in their respective optical paths with the grooves aligned such that the dispersion of each grating occurs along the correct direction, and with static alignment to all other spectrometers optics, thereby removing the need to actively tilt either grating when switching between spectrometer modes.

Referring to FIGS. 8A and 8B, in the first mode of operation of this configuration the electromagnetic radiation 440 enters the system via the second slit 410b, while the first slit 410a may be shuttered (as shown in FIG. 8A). Similarly, in the second mode of operation, the second slit 410b may be shuttered, and the electromagnetic radiation enters the system via the first slit 410a (as shown in FIG. 8B). As discussed above, due the relative alignment of the slits 410 with the FPA 420, in the first mode of operation, the spectrometer may provide relatively wide area coverage with moderate spectral resolution, whereas in the second mode of operation, the spectrometer may provide fine spectral resolution over moderate area coverage. The electromagnetic radiation 440 is directed by the collimating and imaging optics 430 to a beamsplitter 470, where it is split between a first optical path that includes the first grating 450a, (shown in FIG. 8A) and a second optical path that includes the second grating 450b (shown in FIG. 8B). As discussed above, in each mode of operation, the unused grating 450a or 450b may be shuttered such that stray electromagnetic radiation from that grating is not returned to the FPA 420. Thus, in the first mode of operation, a first shutter 480a may be moved into the second optical path to block the second grating 450b, and in the second mode of operation, a second shutter 480b may be moved into the first optical path to block the first grating 450a. In one embodiment, the first and second shutters 480a, 480b may be replaced with a single shutter that is selectively movable between a first position in the second optical path, blocking the second grating 450b, and a second position in the first optical path, blocking the first grating 450a. In either mode of operation, the spectrally dispersed electromagnetic radiation is focused from the respective grating 450a or 450b to the FPA 420 by the collimating and imaging optics 430.

As discussed above, FIGS. 9A and 9B illustrate an embodiment of a multi-mode imaging spectrometer similar to that shown in FIGS. 8A and 8B, but incorporating the use of multiple detectors (e.g., two FPAs). Accordingly, in the first mode of operation, the spectrally dispersed electromagnetic radiation 445 is focused onto the first FPA 420a (shown in FIG. 9A), and in the second mode of operation, the spectrally dispersed electromagnetic radiation 445 is focused onto the second FPA 420b (as shown in FIG. 9B).

Thus, there are numerous embodiments and configurations of a multi-mode imaging spectrometer that allow the device to be sequentially operated in two modes; a first mode providing wide area coverage with moderate spectral resolution, and a second mode providing fine spectral resolution over a smaller area. Furthermore, those skilled in the art will appreciate, given the benefit of this disclosure, that numerous variations of the above-discussed examples may be implemented. The various approaches and embodiments may provide a system designer with different benefits and trade-offs. For example, the configuration of FIGS. 4A and 4B may provide the simplest solution with the fewest components, but may offer limited design flexibility. The configurations of FIGS. 5A-B, 7A-B, and 9A-B include the use of two imaging detectors, which may provide greater flexibility to optimize the imaging detector for each mode. For example, the size, pixel count, detector cutoff, and/or performance of the two FPAs 420a and 420b need not be the same, and may be selected at least in part based on the resolution and spatial coverage desired in each mode of operation. Additionally, these configurations may easily incorporate the use of filters associated with one or both imaging detectors. The configurations of FIGS. 8A-B and 9A-B replace the need to tilt and rotate the grating 450 by incorporating the use of two gratings 450a, 450b, and the beamsplitter 470. These configurations may offer the best spectral calibration because there are no moving parts (slight misalignments in the rotation and/or tilt of the grating 450, or angle of the inserted fold mirror 460 may shift spectral calibration in the other configurations), but may offer lower throughput due to the dichroic beamsplitter 470. Additionally, in these configurations 8A-B and 9A-B, if the beamsplitter 470 is a dichroic beamsplitter, the two different modes of operation must use at least slightly different spectral ranges/bands of the electromagnetic radiation 440. Alternatively, if the beamsplitter 470 is an amplitude beamsplitter, then attenuation of electromagnetic radiation 440 must be accounted for in a radiometric performance budget. The configurations of FIGS. 6A-B and 7A-B replace the need to tilt and rotate the grating 450 by incorporating the use of two gratings and a fold mirror that is selectively movable into and out of the optical path, as discussed above. These configurations may offer a balance between system complexity and performance.

Figure 10:
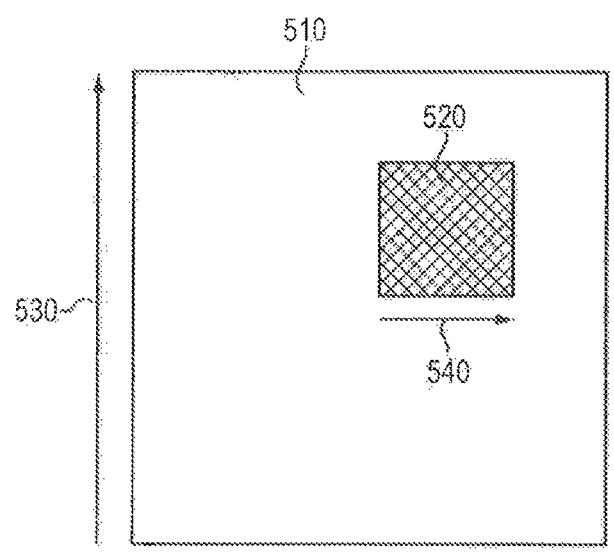
FIG. 10 is a block diagram illustrating one example of relative imaged areas and scan directions in the two modes of operation of the multi-mode imaging spectrometer of any of FIGS. 4A-9B, according to aspects of the invention.

As discussed above and referring again to FIG. 1, the two-axis scanning assembly 130 is configured to scan the field-of-view of the multimode imaging spectrometer over the scene being imaged. The image of the slit 410a or 410b projected onto the viewed scene at any given moment in time provides one "line" of the image of the scene, and the entire image is built up by scanning the projection of the slit across the scene. Referring to FIG. 10, as discussed above, in the first mode of operation, the multimode spectrometer images a relatively wide area 510 (with moderate spectral resolution), and in the second mode of operation, the multimode spectrometer images a smaller area 520 (with fine spectral resolution). Because the two slits 410a, 410b are arranged orthogonal to one another, the scan direction is different (orthogonal) between the two modes. For example, arrow 530 may represent the scan direction in the first mode of operation, and arrow 540 may represent the scan direction in the second mode of operation. Hence the need for a method to perform scanning in each direction (e.g., using the two-axis scanning assembly 130).

According to one embodiment, the spectrometer is configured to image the wide area 510 in the first mode of operation, and the image data from the first mode is processed, optionally in real time, by the processor 170. The processor 170 may provide near-real-time detection cues based on the processing of the first mode image data, and these detection cues may be used to command a reconfiguration of the spectrometer into the second mode of operation (e.g., as represented by feedback arrow 180). For example, if an object of interest is detected in the imaged scene, the system may be directed to provide a more detailed (finer resolution) scan of the area of the scene containing the object of interest. Thus, the spectrometer may be reconfigured into the second mode of operation to image the smaller area 520 around the object of interest. In some instances, multiple detections in the first image 510 may require multiple smaller images 520 to be acquired, one around each of the detections. In certain applications, image data captured during the second mode of operation of the spectrometer may be used to provide high confidence identification of the object of interest. Thus, aspects and embodiments may provide a configurable multi-mode imaging spectrometer that is capable of being sequentially operated in two different modes, one producing wide area images with moderate spectral resolution, and the other providing narrower area images with fine spectral resolution, using a common optical prescription for both modes. Real-time, or near-real-time, processing of the image data can be used to selectively and dynamically change the mode of operation of the spectrometer to accomplish imaging objectives in a wide variety of applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-mode imaging spectrometer comprising:
   a first entrance slit having a first orientation;
   a second entrance slit having a second orientation, the second orientation being substantially orthogonal to the first orientation;
   a first dispersive element and a second dispersive element each configured to spectrally disperse electromagnetic radiation and provide spectrally dispersed electromagnetic radiation;
   collimating and imaging optics configured to receive the electromagnetic radiation from the first entrance slit during a first mode of operation of the imaging spectrometer and from the second entrance slit during a second mode of operation of the imaging spectrometer, and wherein in the first mode of operation the collimating and imaging optics are further configured to direct the electromagnetic radiation from the first entrance slit to the first dispersive element;
   at least one imaging detector configured to receive the spectrally dispersed electromagnetic radiation and produce image data therefrom, the collimating and imaging optics being further configured to, in the first mode of operation, focus the spectrally dispersed electromagnetic radiation from the first dispersive element onto the at least one imaging detector;
   a movable fold mirror, wherein in the second mode of operation the movable fold mirror is positioned in an optical path between the collimating and imaging optics and the second dispersive element, the collimating and imaging optics being further configured to, in the second mode of operation, direct the electromagnetic radiation from the second entrance slit to the movable fold mirror, the fold mirror being further configured to reflect the electromagnetic radiation from the collimating and imaging optics to the second dispersive element, and to reflect the spectrally dispersed electromagnetic radiation from the second dispersive element to the collimating and imaging optics, and the collimating and imaging optics being further configured to focus the spectrally dispersed electromagnetic radiation from the fold mirror onto the at least one imaging detector; and
   a processor coupled to the at least one imaging detector and configured to receive and process image data from the at least one imaging detector and, responsive to processing the image data, select one of the first and second modes of operation of the multi-mode imaging spectrometer.

2. The multi-mode imaging spectrometer of claim 1, wherein the at least one imaging detector has a two-dimensional image plane with non-square aspect ratio and being positioned such that a first dimension of the image plane is aligned with a length of the first entrance slit and a second dimension of the image plane is aligned with a length of the second entrance slit.

3. The multi-mode imaging spectrometer of claim 1, wherein the first dispersive element is a first grating and the second dispersive element is a second grating.

4. The multi-mode imaging spectrometer of claim 3 wherein the at least one imaging detector includes a first imaging detector and a second imaging detector; and
   wherein in the first mode of operation of the multi-mode imaging spectrometer, the spectrometer is configured such that the collimating and imaging optics focus the spectrally dispersed electromagnetic radiation from the first grating onto the first imaging detector; and
   wherein in the second mode of operation of the multi-mode imaging spectrometer, the spectrometer is configured such that the collimating and imaging optics focus the spectrally dispersed electromagnetic radiation from the second grating onto the second imaging detector.

5. The multi-mode imaging spectrometer of claim 1 wherein at least one of the first dispersive element and the second dispersive element is a prism.

6. The multi-mode imaging spectrometer of claim 1 wherein the at least one imaging detector includes a first imaging detector and a second imaging detector; and
   wherein in the first mode of operation, the spectrometer is configured such that the collimating and imaging optics focus the spectrally dispersed electromagnetic radiation onto the first imaging detector; and
   wherein in the second mode of operation, the spectrometer is configured such that the collimating and imaging optics focus the spectrally dispersed electromagnetic radiation onto the second imaging detector.

7. The multi-mode imaging spectrometer of claim 1 further comprising a two-axis scan mirror configured to scan a field-of-view of the imaging spectrometer over the desired portion of the scene.

8. The multi-mode imaging spectrometer of claim 1 wherein the collimating and imaging optics are arranged in a double-pass configuration.

9. The multi-mode imaging spectrometer of claim 1 wherein the collimating and imaging optics are arranged in a single-pass configuration.

10. A method of operating a multi-mode imaging spectrometer comprising:
    selecting a first mode of operation of the multi-mode imaging spectrometer, and in the first mode:
      receiving first electromagnetic radiation from a scene via a first entrance slit;

spectrally dispersing the first electromagnetic radiation using a first dispersive element, thereby producing first spectrally dispersed electromagnetic radiation; and imaging the first spectrally dispersed electromagnetic radiation with at least one imaging detector to produce a first spectral image of the scene having a first spectral resolution; and subsequently selecting a second mode of operation of the multi-mode imaging spectrometer, and in the second mode:

receiving second electromagnetic radiation from a portion of the scene via a second entrance slit that is substantially orthogonally oriented relative to the first entrance slit;

spectrally dispersing the second electromagnetic radiation, thereby producing second spectrally dispersed electromagnetic radiation, wherein spectrally dispersing the second electromagnetic radiation includes:

positioning a fold mirror into an optical path between the second entrance slit and a second dispersive element;

reflecting the second electromagnetic radiation onto the second dispersive element with the fold mirror;

spectrally dispersing the second electromagnetic radiation with the second dispersive element, thereby producing the second spectrally dispersed electromagnetic radiation; and reflecting the second spectrally dispersed electromagnetic radiation towards the at least one imaging detector with the fold mirror; and imaging the second spectrally dispersed electromagnetic radiation with the at least one imaging detector to produce a second spectral image of the portion of the scene having a second spectral resolution, the second spectral resolution being finer than the first spectral resolution.

11. The method of claim 10 wherein spectrally dispersing the first electromagnetic radiation using the first dispersive element includes spectrally dispersing the first electromagnetic radiation using a grating.

12. The method of claim 11 wherein imaging the first spectrally dispersed electromagnetic radiation includes imaging the first spectrally dispersed electromagnetic radiation using a first imaging detector; and wherein imaging the second spectrally dispersed electromagnetic radiation includes imaging the second spectrally dispersed electromagnetic radiation using a second imaging detector.

13. The method of claim 10 wherein imaging the first spectrally dispersed electromagnetic radiation includes imaging the first spectrally dispersed electromagnetic radiation using a first imaging detector; and wherein imaging the second spectrally dispersed electromagnetic radiation includes imaging the second spectrally dispersed electromagnetic radiation using a second imaging detector.

14. The method of claim 10 wherein selecting the first mode of operation includes shuttering the second entrance slit; and wherein subsequently selecting the second mode of operation includes opening the second entrance slit and shuttering the first entrance slit.

15. The method of claim 10 further comprising:

analyzing the first spectral image with a processor; and subsequently selecting the second mode of operation based on information obtained from the analyzing.

16. The method of claim 15 wherein analyzing the first spectral image includes identifying an object of interest in the scene; and wherein selecting the second mode of operation includes directing a field of view of the spectrometer toward the portion of the scene containing the object of interest.

\* \* \* \* \*